US011777395B2

United States Patent
Shui et al.

(10) Patent No.: US 11,777,395 B2
(45) Date of Patent: Oct. 3, 2023

(54) ISOLATED COMMUNICATIONS APPARATUS AND POWER SUPPLY SYSTEM

(71) Applicant: Huawei Digital Power Technologies Co., Ltd., Shenzhen (CN)

(72) Inventors: Wei Shui, Dongguan (CN); Li Zhou, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 17/679,386

(22) Filed: Feb. 24, 2022

(65) Prior Publication Data

US 2022/0277893 A1 Sep. 1, 2022

(30) Foreign Application Priority Data

Feb. 26, 2021 (CN) .......................... 202110220907.9

(51) Int. Cl.
*H02M 1/00* (2006.01)
*H02M 5/22* (2006.01)
(Continued)

(52) U.S. Cl.
CPC ......... *H02M 1/007* (2021.05); *H02M 1/0074* (2021.05); *H02M 1/092* (2013.01);
(Continued)

(58) Field of Classification Search
CPC .. H02M 1/007; H02M 1/0074; H02M 1/0092; H02M 3/33584; H02M 5/225; H02M 7/043; H01F 27/40; H01F 27/408
See application file for complete search history.

(56) References Cited

U.S. PATENT DOCUMENTS

| 2010/0156189 A1* | 6/2010 | Fishman | H02M 7/493 307/77 |
| 2018/0109199 A1* | 4/2018 | Fujita | H02M 7/12 |
| 2021/0265917 A1* | 8/2021 | Malone | H05B 47/18 |

FOREIGN PATENT DOCUMENTS

| JP | 2019041556 A | 3/2019 |
| WO | 2013178249 A1 | 12/2013 |

OTHER PUBLICATIONS

Teng et al., "Research on Solid State Transformer with Medium and High Voltage DC Output", Science and Technology Innovation and Application, 2016, No. 15, 3 pages (including English abstract).
(Continued)

*Primary Examiner* — Jue Zhang
(74) *Attorney, Agent, or Firm* — Maier & Maier, PLLC

(57) ABSTRACT

An isolated communications apparatus applied to a transformer. The transformer includes N first rectifier units and a second rectifier unit, and the isolated communications apparatus includes N first control units, a second control unit, and a signal convergence unit. The first control units are connected to the first rectifier units in a one-to-one correspondence. Each first control unit is connected to the signal convergence unit, and the signal convergence unit and the second control unit are connected through an optical fiber. The signal convergence unit is configured to: receive first data packets from the N first control units, send the first data packets to the second control unit, receive at least one second data packet from the second control unit, determine a first control unit corresponding to each second data packet, and send each second data packet to a corresponding first control unit.

18 Claims, 10 Drawing Sheets

(51) Int. Cl.
*H02M 1/092* (2006.01)
*H01F 27/40* (2006.01)
*H02M 7/04* (2006.01)
*H02M 3/335* (2006.01)

(52) U.S. Cl.
CPC ............ *H02M 5/225* (2013.01); *H01F 27/40* (2013.01); *H01F 2027/408* (2013.01); *H02M 3/33584* (2013.01); *H02M 7/043* (2013.01)

(56) References Cited

OTHER PUBLICATIONS

Lei et al.,"Solid-state Transformer Hardware Design Based on Modular Architecture", Journal of Power Supply, vol. 17, No. 5, Sep. 2019, 7 pages (including English abstract).

* cited by examiner

--Prior Art--

ISOLATED COMMUNICATIONS APPARATUS AND POWER SUPPLY SYSTEM

CROSS-REFERENCE TO RELATED APPLICATION

This application claims priority to Chinese Patent Application No. 202110220907.9, filed on Feb. 26, 2021, which is hereby incorporated by reference in its entirety.

TECHNICAL FIELD

The embodiments are related to the field of alternating current power transmission, an isolated communications apparatus, and a power supply system.

BACKGROUND

As basic devices of voltage conversion and electric isolation, transformers are widely used in the field of power transmission and distribution. A solid state transformer (SST) emerges, to meet the following requirements of a transformer: voltage conversion and adjustment, flexible power control, and a fault diagnosis and isolation communications capability. The solid state transformer is a device that implements power conversion by combining a high-frequency coupling apparatus according to an electromagnetic induction principle and a power electronics conversion technology. Because an isolated converter of the solid state transformer usually operates below a switching frequency of 10 kHz to 100 kHz, a weight and a volume of the transformer can be greatly reduced compared with a weight and a volume of a conventional transformer. In addition, the solid state transformer has good control performance of both power flow control and reactive power compensation and has a fast response speed. Voltage amplitudes on a primary side and a secondary side can be kept constant, and do not fluctuate greatly due to load switching. An alternating current waveform distortion rate is small and is basically a sinusoidal distortion rate, and a power factor is flexibly controlled, so that network communication can be realized, and a power grid is intelligent.

FIG. 1 is a schematic diagram of a structure of a solid state transformer. Medium-voltage rectifier units are connected in a cascaded manner in an input stage to reduce voltage stress of a switching device in the medium-voltage rectifier unit and change a medium voltage into a plurality of low voltages in series, a high-frequency transformer is used in an intermediate stage, and a low-voltage rectifier unit is used in an output stage. The solid state transformer further includes a plurality of medium-voltage controllers and a low-voltage controller, to implement flexible power control. Each medium-voltage controller detects and controls a medium-voltage rectifier unit corresponding to the medium-voltage controller, and the low-voltage controller detects and controls a low-voltage rectifier unit corresponding to the low-voltage controller.

As shown in FIG. 1, each medium-voltage controller needs to communicate with the low-voltage controller, to transfer various information, to implement power control. Power is supplied by each medium-voltage rectifier unit to the medium-voltage controller, and the medium-voltage rectifier units are at a floating potential. Therefore, when transferring various information, the medium-voltage controller and the low-voltage controller need to perform isolation communication. A potential of the medium-voltage controller and a potential of the low-voltage controller differ greatly. Therefore, in consideration of safety production specifications, currently, the medium-voltage controller and the low-voltage controller communicate with each other through an optical fiber as an isolated channel. However, an increase in a quantity of optical fibers leads to an increase in costs. In view of this, how to reduce a quantity of used optical fibers to reduce costs is an urgent problem to be resolved in the art.

SUMMARY

An isolated communications apparatus and a power supply system may add a signal convergence unit to forward first data packets that are of a plurality of first control units and that include operating parameters to a second control unit, and send a second data packet that includes a control parameter to a first control unit corresponding to each second data packet, so that the first control unit controls a first rectifier unit corresponding to the first control unit. It is clear that according to the solutions, the isolated communications apparatus can greatly reduce a quantity of used optical fibers, to reduce optical fiber deployment costs.

According to a first aspect, a transformer includes N first rectifier units and a second rectifier unit, a potential difference between at least one of the N first rectifier units and the second rectifier unit is greater than a specified threshold, and the N first rectifier units are connected to each other in a cascaded manner. The isolated communications apparatus includes N first control units, a second control unit, and a signal convergence unit. The N first control units are in a one-to-one correspondence with the N first rectifier units, and each first control unit is connected to a corresponding first rectifier unit. Each of the N first control units is connected to the signal convergence unit, the signal convergence unit and the second control unit are connected through an optical fiber, and N is a positive integer. Any one of the N first control units is configured to: detect an operating parameter of the corresponding first rectifier unit, and generate a first data packet based on the detected operating parameter, where the first data packet includes an identifier of the first control unit; send the first data packet to the signal convergence unit; and receive a second data packet sent by the signal convergence unit, where the second data packet includes the identifier of the first control unit and a control parameter, and adjust the operating parameter of the corresponding first rectifier unit based on the control parameter. The signal convergence unit is configured to: receive first data packets from the N first control units, and send the first data packets of the N first control units to the second control unit; and receive at least one second data packet from the second control unit, determine, based on the identifier that is of the first control unit and that is included in each second data packet, a first control unit corresponding to each second data packet, and send each second data packet to the first control unit corresponding to each second data packet. The second control unit is configured to: receive the first data packets of the N first control units from the signal convergence unit, and generate, based on the first data packets of the N first control units, a second data packet corresponding to at least one first control unit; and send, to the signal convergence unit, the second data packet corresponding to the at least one first control unit.

In view of this, in this embodiment, the signal convergence unit is added to the isolated communications apparatus, to forward first data packets of a plurality of first control units to the second control unit, where the first data packet includes the operating parameter of the first rectifier unit and the identifier of the first control unit, determine, based on the identifier that is of the first control unit and that is included in each second data packet sent by the second control unit, the first control unit corresponding to each second data packet, and send each second data packet to the first control unit corresponding to each second data packet, so that the first control unit controls the first rectifier unit corresponding to the first control unit. It is clear that according to this solution, the isolated communications apparatus can greatly reduce a quantity of used optical fibers, to reduce optical fiber deployment costs.

In some possible embodiments, the isolated communications apparatus further includes N auxiliary power supplies, the N auxiliary power supplies are in a one-to-one correspondence with the N first rectifier units, the N auxiliary power supplies are in a one-to-one correspondence with the N first control units, and each auxiliary power supply is configured to: obtain power from the corresponding first rectifier unit, and supply power to the corresponding first control unit.

Because power needs to be supplied to each first control unit in an isolated manner, power supply difficulty is greatly increased. The auxiliary power supply may include a direct current capacitor and a quasi-resonant flyback converter, to reduce power supply difficulty. The direct current capacitor is externally connected to the first rectifier unit, so that power can be obtained from the externally connected direct current capacitor by using the quasi-resonant flyback converter. When power needs to be supplied to the first control unit, the power obtained by the auxiliary power supply is provided for the first control unit. Based on the foregoing structure, the power is obtained from the first rectifier unit and power is supplied to the first control unit, so that different power requirements of the first control unit can be met, and difficulty of supplying power to the first control unit is reduced.

In some possible implementations, a target auxiliary power supply in the N auxiliary power supplies is further configured to supply power to the signal convergence unit, and a target first rectifier unit corresponding to the target auxiliary power supply is a first rectifier unit other than a first rectifier unit with a lowest potential and a first rectifier unit with a highest potential in the N first rectifier units.

When power is supplied by an external independent power supply to the signal convergence unit, a potential of the signal convergence unit is low. Potentials of some first rectifier units are high, and power is supplied by the auxiliary power supply connected to the corresponding first rectifier unit to the first control unit. Therefore, there is a large potential difference between a first control unit and the signal convergence unit. As the potential difference increases, difficulty of transmitting data in an isolated manner also increases. In view of this, to resolve the foregoing problem, based on the foregoing structure, the potential difference between the signal convergence unit and the first control unit can be reduced, and difficulty of transmitting data in an isolated manner can be reduced.

In some possible implementations, the signal convergence unit includes M processing modules and at least one optical module corresponding to each processing module, where M is a positive integer. Each processing module is connected to the N first control units. Each processing module is connected to at least one corresponding optical module. Each optical module corresponding to each processing module is connected to the second control unit through an optical fiber. A first processing module in the M processing modules is configured to: receive the first data packets from the N first control units, and send the first data packets of the N first control units to a first optical module, where the first processing module is included in the M processing modules, and the first optical module is included in at least one optical module corresponding to the first processing module; and receive the at least one second data packet from the second control unit by using the first optical module, determine, based on the identifier that is of the first control unit and that is included in each second data packet, the first control unit corresponding to each second data packet, and send each second data packet to the first control unit corresponding to each second data packet.

A plurality of processing modules and a plurality of optical modules may be used for redundancy backup, to facilitate communications redundancy backup, and improve reliability of a power supply system. Based on the structure described in the foregoing embodiment, when some processing modules or optical modules in the signal convergence unit are damaged or faulty, data transmission can also be ensured, and functions such as output voltage control can be implemented. A person skilled in the art may independently set a quantity of processing modules and a quantity of optical modules as redundancy backup based on costs for design. In this way, based on only a small quantity of fiber channels, communications redundancy backup can be performed while data is transmitted in an isolated manner, to improve reliability of the power supply system.

In some possible implementations, the M processing modules further include a second processing module. The first processing module is further configured to: after receiving the first data packets from the N first control units, send the first data packets of the N first control units to the second processing module; and receive at least one third data packet returned by the second processing module, determine, based on the identifier that is of the first control unit and that is included in each third data packet, a first control unit corresponding to each third data packet, and send each third data packet to the first control unit corresponding to each third data packet. The second processing module is configured to: receive the first data packets that are of the N first control units and that are sent by the first processing unit, and send the first data packets of the N first control units to a second optical module, where the second optical module is included in at least one optical module corresponding to the second processing module; and receive at least one third data packet from the second control unit by using the second optical module, and return the at least one third data packet of the second control unit to the first processing module.

When some processing modules or optical modules in the signal convergence unit are damaged or faulty, data transmission can also be ensured, and functions such as output voltage control can be implemented. A person skilled in the art may independently set a quantity of processing modules and a quantity of optical modules as redundancy backup based on costs for design. In this way, based on only a small quantity of fiber channels, communications redundancy backup can be performed while data is transmitted in an isolated manner, to improve reliability of the power supply system.

In some possible implementations, the apparatus further includes N isolated transformers. The N isolated transformers are in a one-to-one correspondence with the N first control units, and each of the N isolated transformers is connected to each of the M processing modules. Any one of the N isolated transformers is configured to: receive a first electrical signal carrying a first data packet sent by a corresponding first control unit, perform isolation and voltage transformation processing on the first electrical signal, and send the first electrical signal obtained after the isolation and voltage transformation processing to the first processing module; and receive a second electrical signal that carries a second data packet and that is sent by the first processing module, perform isolation and voltage transformation processing on the second electrical signal, and send the second electrical signal obtained after the isolation and voltage transformation processing to the corresponding first control unit.

The isolated transformer performs isolation and voltage transformation processing on the electrical signal, so that electric on both sides can be completely insulated and loop-isolated, and high-frequency noise at both sides can be further suppressed from being transmitted, to comply with a safety regulation standard for isolation communication. Costs of the isolated transformer are lower than costs of the optical fiber, and therefore communications costs are effectively reduced. In this way, the isolated transformer with lower costs can be used to replace a transmission device such as the optical fiber with higher costs, to improve communications reliability of the power supply system while reducing costs.

In some possible implementations, an operating parameter of any first rectifier unit includes a voltage value of the first rectifier unit and a current value of the first rectifier unit. An operating parameter of the second rectifier unit includes a power value of load connected to the second rectifier unit. The power value of the load connected to the second rectifier unit is detected, to determine the control parameter based on the power value, to dynamically ensure stability of a voltage that is output by the second rectifier unit.

According to a second aspect, an embodiment further provides a power supply system. The power supply system includes a transformer and the isolated communications apparatus described in the first aspect of the summary. For beneficial effects achieved in the second aspect, refer to the first aspect. Details are not described herein again.

DETAILED DESCRIPTION OF THE EMBODIMENTS

Figure 1:
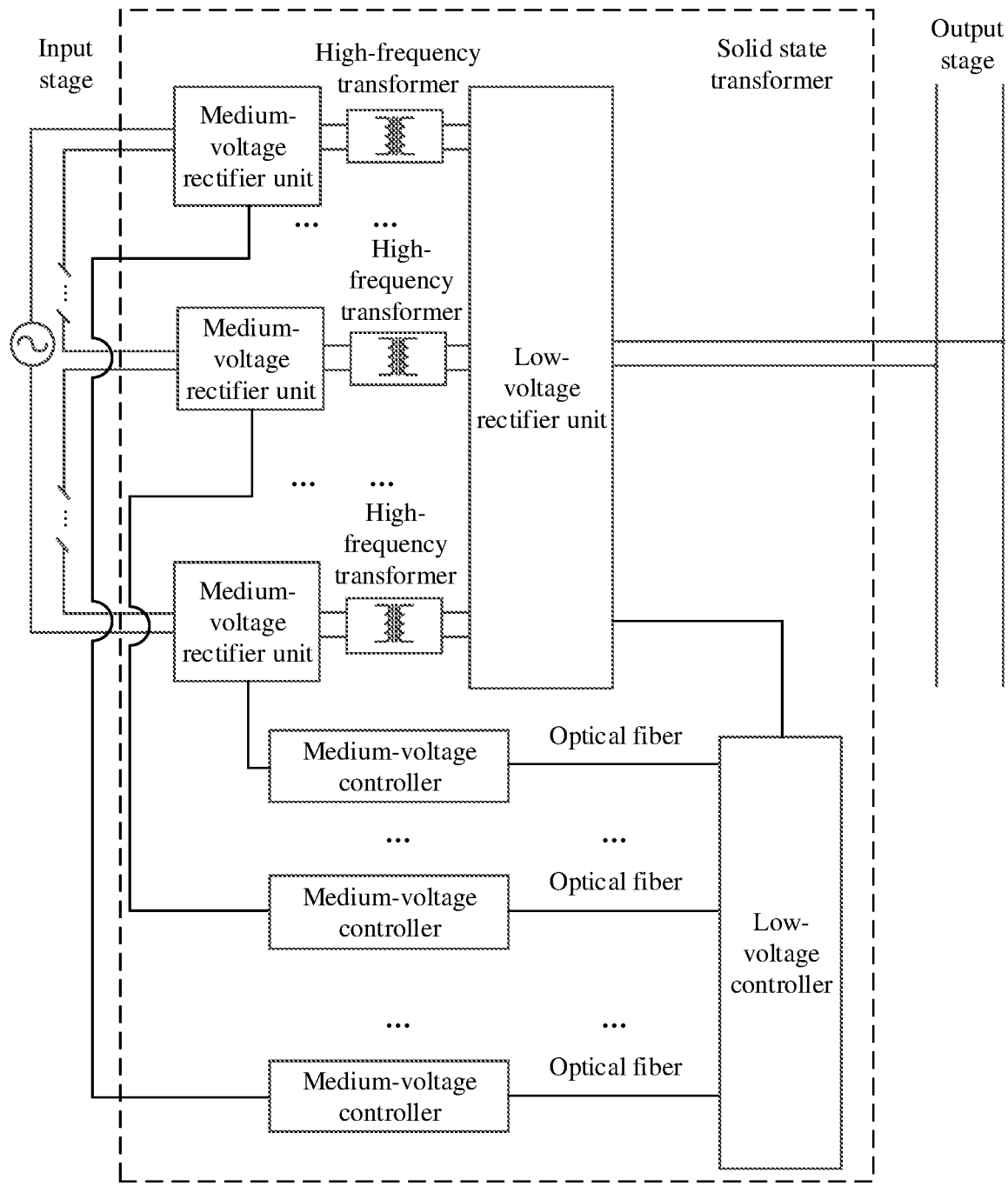
FIG. 1 is a schematic diagram of a structure of a solid state transformer.

To make objectives, solutions, and advantages clear, the following further describes the embodiments in detail with reference to the accompanying drawings.

The following first describes some terms in the embodiments, to facilitate understanding for a person skilled in the art.

(1) Voltage stress: The voltage stress is a ratio of an operating voltage to a rated voltage. A voltage suddenly changes when a high voltage direct current transmission thyristor valve is closed. Due to existence of stray capacitance and inductance of a circuit, the suddenly changed voltage leads to voltage oscillation, forming a transient voltage overshoot, and causing great voltage stress to a thyristor and another electrical component.

(2) Floating potential: The floating potential means that a metal component in electrical equipment loses grounding due to some reasons, and therefore is between a high voltage and a low voltage. A voltage is divided based on impedance of the metal component, and a potential of the metal component to the ground is the floating potential. This may mean that a metal component in the electrical equipment is not grounded, a large amount of electric charge is accumulated, and a potential difference is formed between the electric charge and the earth.

(3) Isolated transformer: The isolated transformer is a safe power supply, and is usually used for machine maintenance, protection, lightning protection, and filtering. The isolated transformer and a common transformer are implemented according to an electromagnetic induction principle. The isolated transformer is used to completely insulate and isolate electric on a primary side and a secondary side. In addition, based on a high-frequency loss of an iron core of the isolated transformer, high-frequency noise can be further suppressed from being transmitted to the other side of a loop. The isolated transformer is also used to protect personal safety and isolate dangerous voltages.

It should be noted that, "at least one" means one or more, and "plurality" means two or more. In view of this, in the embodiments, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects. In addition, it should be understood that, in the description, terms such as "first" and "second" are merely used for distinguishing and description but cannot be understood as indicating or implying relative importance, or indicating or implying an order.

To facilitate understanding of an isolated communications apparatus provided in the embodiments, an application scenario of the isolated communications apparatus is first described below.

The isolated communications apparatus provided in the embodiments may be applied to various transformers in a power supply system, for example, a solid state transformer. The solid state transformer is a device that implements power conversion by combining a high-frequency coupling apparatus according to an electromagnetic induction principle and a power electronics conversion technology. The solid state transformer is widely used. In addition to changing a voltage, the solid state transformer is further configured to: smoothly transition alternating current power to direct current power, and then transition from direct current power to alternating current power. The alternating current power may be determined based on a type of a power grid. This is not limited herein.

A power supply system including a solid state transformer is used as an example below for description.

Figure 2:
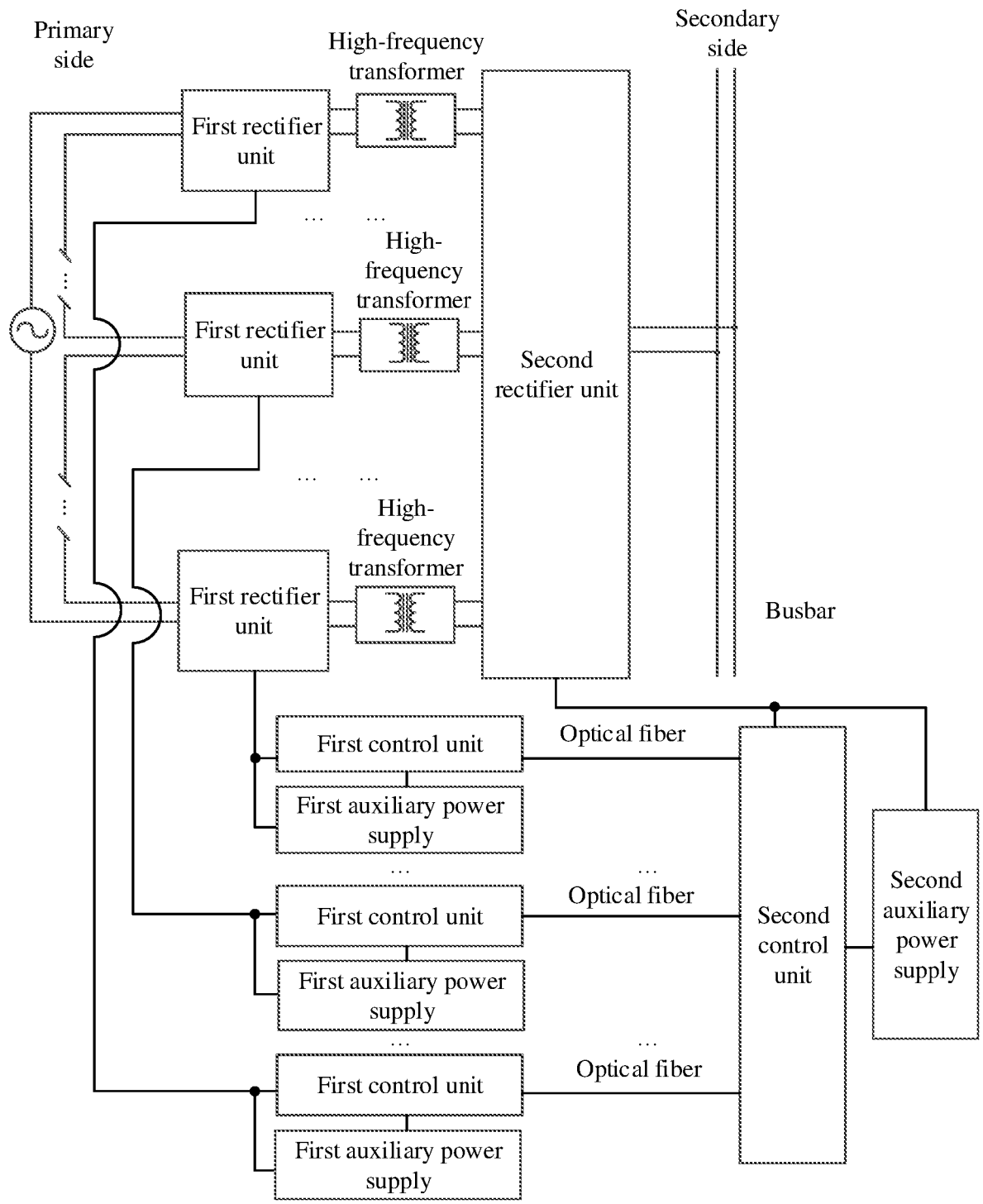
FIG. 2 is a schematic diagram of a structure of a power supply system.

FIG. 2 is a schematic diagram of a structure of a power supply system according to an embodiment. The power supply system includes a plurality of first rectifier units, a second rectifier unit, a plurality of high-frequency transformers, a plurality of first control units, and a second control unit. The plurality of first rectifier units are connected to the plurality of high-frequency transformers in a one-to-one correspondence manner, the plurality of high-frequency transformers are connected to the second rectifier unit, the plurality of first rectifier units are connected to each other in a cascaded manner and then connected to a primary side, the plurality of first control units are connected to the plurality of first rectifier units in a one-to-one correspondence manner, the second rectifier unit is connected to the second control unit, and the second rectifier unit is connected to a busbar on a secondary side.

The first rectifier unit may include an alternating current to direct current (AC/DC) circuit, and the second rectifier unit may include a direct current to direct current (DC/DC) circuit or a direct current to alternating current (DC/AC) circuit. Voltage regulation transmission with different turn ratios is implemented between the plurality of first rectifier units and the second rectifier unit through the plurality of high-frequency transformers. The power supply system including the solid state transformer is commonly used in a power distribution network with a very high voltage level. Therefore, if one first rectifier unit is used, the first rectifier unit needs to withstand a shock on a high input voltage. The plurality of first rectifier units that are connected in a cascaded manner may be used to reduce the input voltage shock to the first rectifier unit. The input voltage is evenly divided by the plurality of first rectifier units that are connected in a cascaded manner, so that the input voltage shock to each first rectifier unit can be reduced.

In the foregoing power supply system, the plurality of first control units and the second control unit may be disposed to control an output voltage in real time. The first control unit is configured to: detect an operating parameter of the first rectifier unit correspondingly connected to the first control unit and send the detected operating parameter to the second control unit. The second control unit calculates a control parameter based on the operating parameter sent by each of the plurality of first control units and returns the control parameter to each first control unit. Each first control unit adjusts, based on the control parameter, the operating parameter of the first rectifier unit correspondingly connected to the first control unit, to control all the first rectifier units, to adjust the output voltage in real time.

For example, if an input voltage on a primary side is 10 kVac and an output voltage on a secondary side is 220 Vac/380 Vac/400 Vdc, seven first rectifier units that are connected in a cascaded manner may be obtained through division based on a withstand voltage limit of a switching device in the first rectifier unit. The input voltage is evenly divided by the seven first rectifier units that are connected in a cascaded manner. Therefore, a voltage difference of 1500 V may theoretically exist between the first rectifier units that are connected in a cascaded manner. For example, if a potential of the $1^{st}$ first rectifier unit in a cascaded state is 10 kV, a potential of the $2^{nd}$ first rectifier unit in a cascaded state is 8.5 kV, and so on.

Powered may be supplied by the first rectifier unit to the first control unit, and power may be supplied by the second rectifier unit to the second control unit, so that the first control unit and the second control unit can also work normally without any external power supply. A plurality of first auxiliary power supplies may be disposed on the primary side, the plurality of first auxiliary power supplies are connected to the first rectifier units in a one-to-one correspondence manner, and the first auxiliary power supply is configured to supply power to the first control unit after obtaining power from the first rectifier unit. A second auxiliary power supply may also be disposed on the secondary side and is configured to supply power to the second control unit after obtaining power from the second rectifier unit. Because the first auxiliary power supply obtains power from each first rectifier unit, and the second auxiliary power supply obtains power from each second rectifier unit, a potential of the first rectifier unit is the same as a potential of the first auxiliary power supply and a potential of the first control unit, and a potential of the second rectifier unit is the same as a potential of the second auxiliary power supply and a potential of the second control unit. Therefore, with reference to the foregoing example, a potential difference between the first control unit and the second control unit may reach a maximum of about 10 kV. Although a conventional isolated transformer configured to transmit data in an isolated manner has low costs and high reliability, the isolated transformer cannot support transmission of an electrical signal with a potential difference greater than 5 kV due to safety regulation limitations of the isolated transformer. Therefore, the isolated transformer cannot be used to transmit the electrical signal between the first control unit and the second control unit, and the data can be transmitted between the first control unit and the second control unit only through an optical fiber.

Due to a withstand voltage limit of the first rectifier unit, as a voltage level of a power distribution network continuously increases, a quantity of first rectifier units that are connected in a cascaded manner is increasing. Therefore, a quantity of required first control units is increasing accordingly. Each time one first control unit is added, one optical transmission channel needs to be added. Costs of the optical fiber are very high, and therefore an increase in a quantity of optical fibers leads to an increase in costs.

In the embodiments, the signal convergence unit is added to the isolated communications apparatus, to forward first data packets of a plurality of first control units to the second control unit, where the first data packet includes the operating parameter of the first rectifier unit and the identifier of the first control unit, determine, based on the identifier that is of the first control unit and that is included in each second data packet sent by the second control unit, the first control unit corresponding to each second data packet, and send each second data packet to the first control unit corresponding to each second data packet, so that the first control unit controls the first rectifier unit corresponding to the first control unit. It is clear that according to the solution, the isolated communications apparatus can greatly reduce a quantity of used optical fibers, to reduce optical fiber deployment costs.

Figure 3:
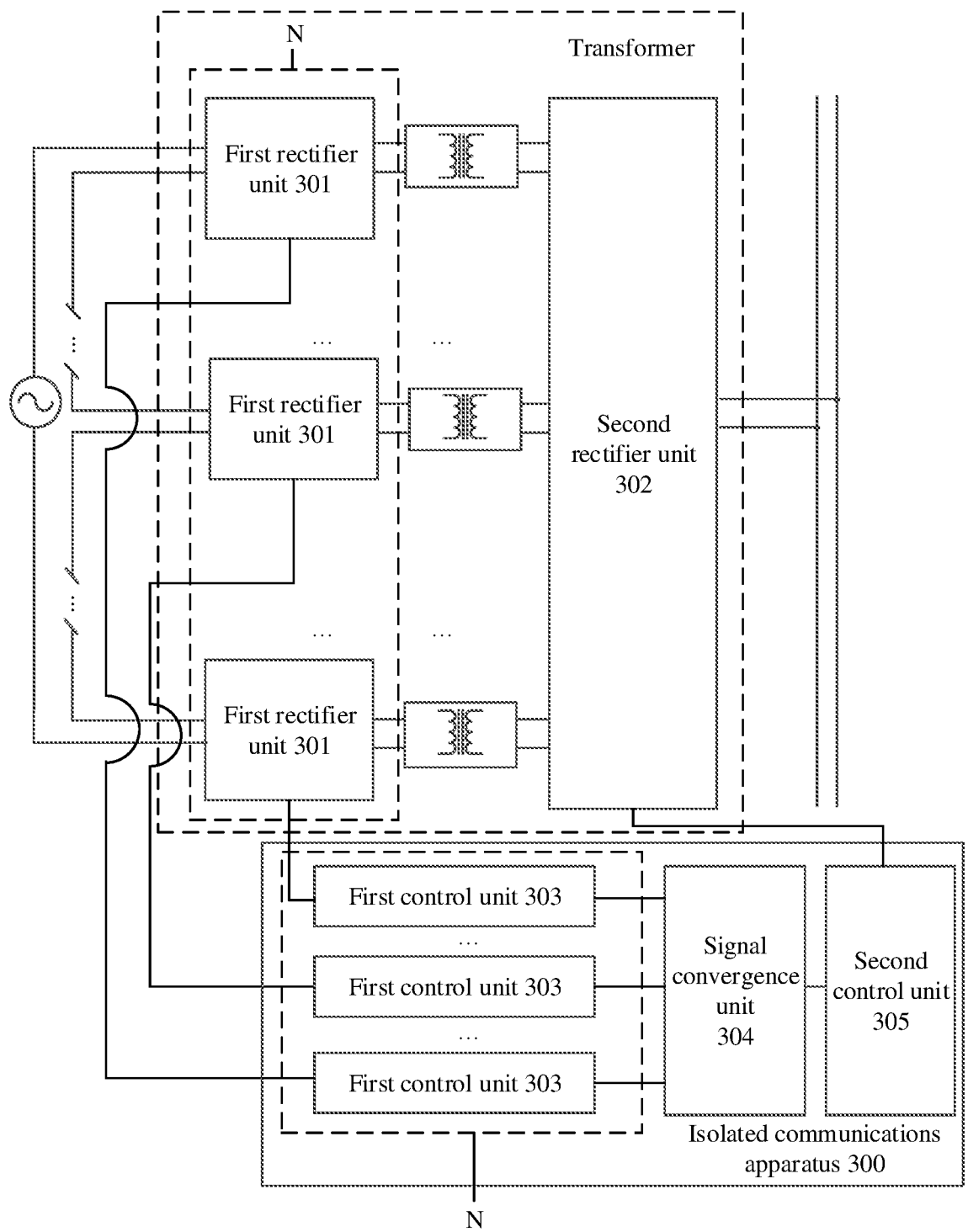
FIG. 3 is a schematic diagram of a structure of an isolated communications apparatus applied to a transformer.

FIG. 3 is a schematic diagram of a structure of an isolated communications apparatus applied to a transformer. The transformer includes N first rectifier units 301 and a second rectifier unit 302, a potential difference between at least one of the N first rectifier units 301 and the second rectifier unit 302 is greater than a specified threshold, and the N first rectifier units 301 are connected to each other in a cascaded manner.

The isolated communications apparatus 300 includes N first control units 303, a signal convergence unit 304, and a second control unit 305. The N first control units 303 are in a one-to-one correspondence with the N first rectifier units 301, and each first control unit 303 is connected to a corresponding first rectifier unit 301. Each of the N first control units 303 is connected to the signal convergence unit 304, the signal convergence unit 304 and the second control unit 305 are connected through an optical fiber, and N is a positive integer.

In this embodiment, a rectifier circuit is constructed by connecting the N first rectifier units 301 in a cascaded manner, to reduce an input voltage carried by each first rectifier unit 301. A high-frequency transformer may be disposed between each first rectifier unit 301 and the second rectifier unit 302. The N first rectifier units 301 are configured to convert a first alternating current voltage on a primary side of a power supply system into a first direct current voltage. The high-frequency transformer is configured to convert the first direct current voltage into a second direct current voltage. The second rectifier unit 302 is configured to convert the second direct current voltage into a second alternating current voltage or a third direct current voltage, where a conversion relationship between the first direct current voltage and the second direct current voltage is related to a turn ratio of the high-frequency transformer. The potential difference between the at least one first rectifier unit 301 and the second rectifier unit 302 is greater than the specified threshold, where the specified threshold is a maximum potential difference between an input isolation signal and an output isolation signal that meet safety regulation requirements of an isolated transformer.

In addition, the first rectifier unit 301 and the second rectifier unit 302 may be symmetrically disposed by using a same circuit structure. The transformer also includes N second rectifier units 302, the N first rectifier units 301 are in a one-to-one correspondence with the N second rectifier units 302, and each first rectifier unit 301 is connected to a corresponding second rectifier unit 302. A schematic diagram of a connection is not shown in the figure herein, and needs to be known to a person skilled in the art.

Optionally, the first rectifier unit 301 and the second rectifier unit 302 may include a plurality of H-bridge rectifier circuits. The first rectifier unit 301 is used as an example. The first rectifier unit 301 may include a first H-bridge rectifier circuit and a second H-bridge rectifier circuit. The first H-bridge rectifier circuit and the second H-bridge rectifier circuit may include a plurality of switching transistors. For example, a switching transistor in the first H-bridge rectifier circuit may perform voltage regulation on an input voltage, and a switching transistor in the second H-bridge rectifier circuit is configured to rectify a voltage obtained after the voltage regulation, to finally output a voltage obtained after the rectification and voltage regulation. The switching transistor may be but is not limited to a metal oxide semiconductor (MOS) or a bipolar junction transistor (BJT).

The following describes functions of the units in a process of applying the isolated communications apparatus 300 to the transformer.

Any one of the N first control units 303 is configured to: detect an operating parameter of the corresponding first rectifier unit 301, and generate a first data packet based on the detected operating parameter, where the first data packet includes an identifier of the first control unit 303; send the first data packet to the signal convergence unit 304; and receive a second data packet sent by the signal convergence unit 304, where the second data packet includes the identifier of the first control unit 303 and a control parameter, and adjust the operating parameter of the corresponding first rectifier unit 301 based on the control parameter.

The signal convergence unit 304 is configured to: receive first data packets from the N first control units 303, and send the first data packets of the N first control units 303 to the second control unit 305; and receive at least one second data packet from the second control unit 305, determine, based on the identifier that is of the first control unit 303 and that is included in each second data packet, a first control unit 303 corresponding to each second data packet, and send each second data packet to the first control unit 303 corresponding to each second data packet.

The second control unit 305 is configured to: receive the first data packets of the N first control units 303 from the signal convergence unit, and generate, based on the first data packets of the N first control units 303, a second data packet corresponding to at least one first control unit 303; and send, to the signal convergence unit 304, the second data packet corresponding to the at least one first control unit 303.

Figure 4:
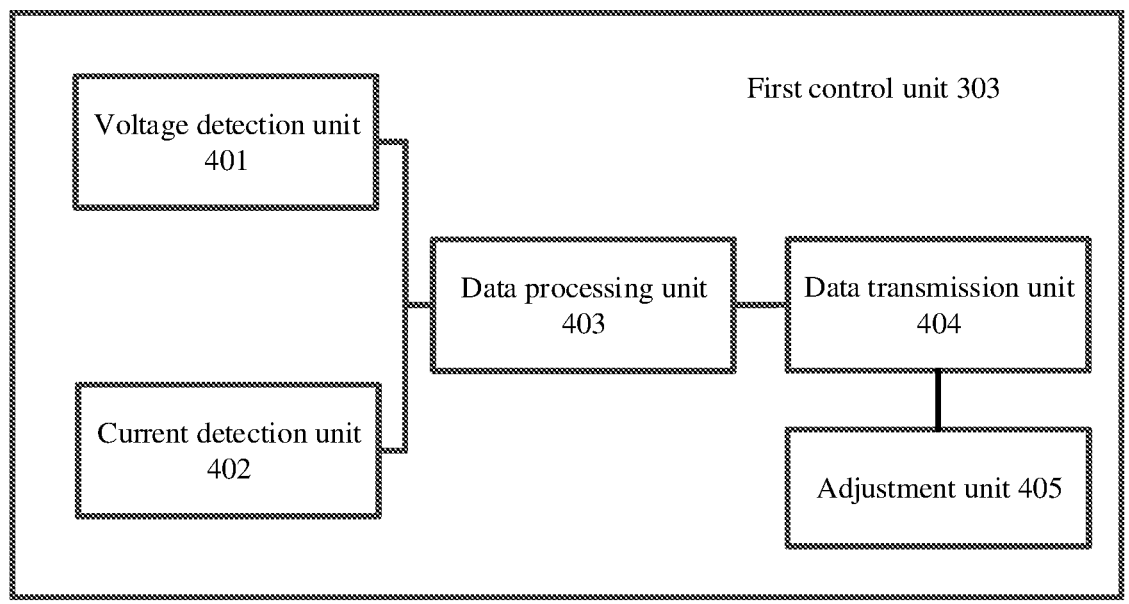
FIG. 4 is a schematic diagram of a structure of a first control unit.

In some possible implementations, the operating parameter of the first rectifier unit 301 may include but is not limited to a voltage value of the first rectifier unit 301 and a current value of the first rectifier unit 301. For example, an embodiment provides a structure of a first control unit 303. FIG. 4 is a schematic diagram of the structure of the first control unit 303. Refer to FIG. 4. Any one of the N first control units 303 may include a voltage detection unit 401, a current detection unit 402, a data processing unit 403, a data transmission unit 404, and an adjustment unit 405.

The voltage detection unit 401 may detect, in a resistance voltage division manner, a voltage value of a first rectifier unit 301 corresponding to the first control unit 303. The current detection unit 402 may detect, by using a Hall sensor, a current value of the first rectifier unit 301 corresponding to the first control unit 303. In this embodiment, a manner of detecting the voltage value and the current value is not limited to the method provided in this embodiment and is not limited herein.

The data processing unit 403 is configured to: generate a first data packet based on a detected operating parameter of the first rectifier unit 301; and receive a second data packet sent by the data transmission unit 404, determine a control parameter based on the second data packet, and send the control parameter to the adjustment unit 405. Optionally, the data processing unit 403 may be a processor or a controller, for example, may be a general-purpose central processing unit (CPU), a general-purpose processor, a digital signal processor (DSP), an application-specific integrated circuit (ASIC), a field programmable gate array (FPGA), another programmable logic device, a transistor logic device, a hardware component, or any combination thereof. The processor may be a combination of processors implementing a computing function, for example, a combination including one or more microprocessors, or a combination of a DSP and a microprocessor. The data processing unit 403 may further include an analog to digital converter (ADC), configured to convert an analog parameter entered by the voltage detection unit 401 and the current detection unit 402 into a digital parameter.

The data transmission unit 404 may include a data interface configured to transmit a data packet, and the data interface may include a low-voltage differential signaling (LVDS) interface, a low-voltage positive emitter coupled logic (LVPECL) interface, or a current mode logic (CML) interface. The data processing unit 403 determines data frame protocols supported by LVDS, LVPECL, and CML, and converts the operating parameter of the first rectifier unit 301 into the first data packet according to the data frame protocols.

In addition, to enable the second control unit 305 to determine the first rectifier unit 301 corresponding to the operating parameter, the first data packet further includes an identifier of the first control unit 303, so that the second control unit 305 determines, based on the identifier of the first control unit 303, the first rectifier unit 301 corresponding to the first control unit 303.

The data transmission unit 404 is configured to: send the first data packet to the signal convergence unit 304; and receive a second data packet sent by the signal convergence unit 304 and send the second data packet to the data processing unit 403, where the received second data packet and the first data packet are in a same data frame protocol type. The data transmission unit 404 may send the first data packet to the signal convergence unit 304 by using a pulse width modulation (PWM) signal that carries the first data packet.

The adjustment unit 405 is configured to adjust, based on the control parameter included in each second data packet, the operating parameter of the first rectifier unit 301 correspondingly connected to the first control unit 303. For example, when the first rectifier unit 301 is an H-bridge rectifier circuit including a switching transistor, the control parameter may include opening/closing duration of the switching transistor, so that the adjustment unit 405 adjusts, by adjusting the opening/closing duration of the switching transistor, the working parameter of the first rectifier unit 301 correspondingly connected to the first control unit 303.

A processor or a controller may also be disposed in the signal convergence unit 304. For a type and description of the processor or the controller, refer to the description of the data processing unit 403. Details are not described herein again. The processor or the controller in the signal convergence unit 304 is configured to: receive first data packets from the N first control units 303, and send the first data packets of the N first control units 303 to the second control unit 305; and receive at least one second data packet from the second control unit 305, identify, based on the identifier that is of the first control unit 303 and that is included in each second data packet, a first control unit 303 to which each second data packet correspondingly belongs, and send the second data packet to the first control unit 303 indicated by the identifier.

Figure 5:
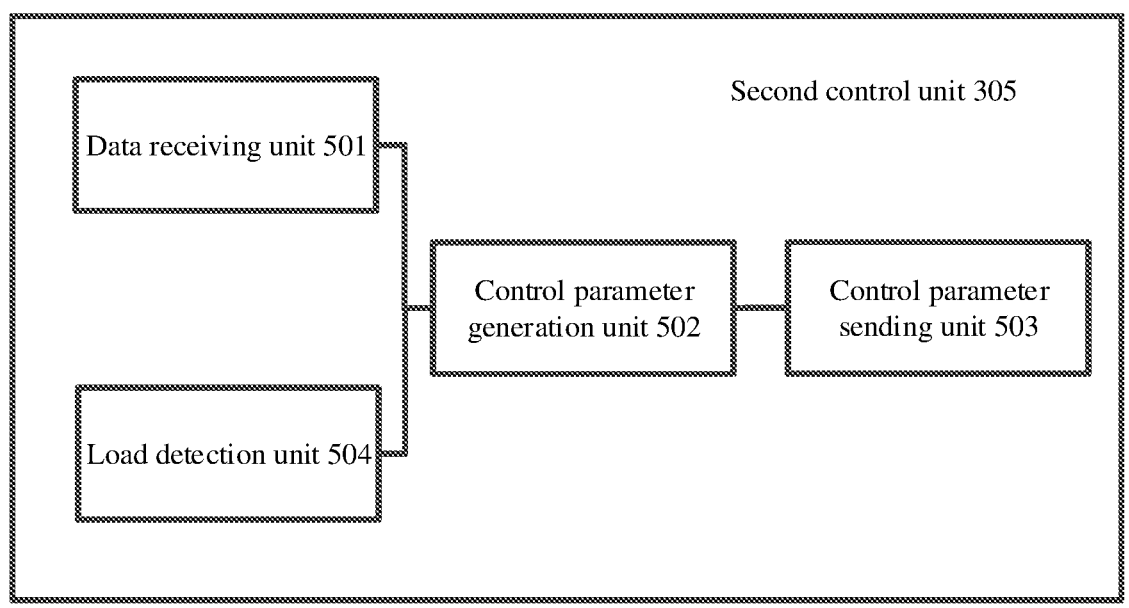
FIG. 5 is a schematic diagram of a structure of a second control unit.

The second control unit 305 may generate, based on the first data packets of the N first control units 303, the second data packet corresponding to the at least one first control unit 303. FIG. 5 is a schematic diagram of a structure of a second control unit 305. The second control unit 305 includes a data receiving unit 501, a control parameter generation unit 502, and a control parameter sending unit 503.

The data receiving unit 501 is configured to: receive the first data packets that are of the N first control units 303 and that are sent by the signal convergence unit 304 and send operating parameters of the N first rectifier units 301 to the control parameter generation unit 502.

The control parameter generation unit 502 may alternatively be a processor or a controller. For a type of the processor or the controller, refer to the description of the data processing unit 403. Details are not described herein again. The control parameter generation unit 502 determines a control parameter based on the operating parameters of the N first rectifier units 301 by using an algorithm for determining the control parameter; and generates, based on the control parameter, a second data packet corresponding to at least one first control unit 303, and sends the second data packet to the control parameter sending unit 503. The algorithm for determining the control parameter may include a step wave modulation method, a harmonic elimination pulse width modulation method, a harmonic injection pulse width modulation method, a switching frequency optimization pulse width modulation method, a space vector modulation method, a sinusoidal pulse width modulation (SPWM) method, and the like. An algorithm is not limited herein. Any algorithm for determining the control parameter that may be applied to a solid state transformer may be applied to the embodiments.

The control parameter sending unit 503 is configured to send the second data packet to the signal convergence unit 304. The control parameter sending unit 503 may also send the first data packet to the signal convergence unit 304 by using a PWM signal that carries the first data packet.

In some possible implementations, the second control unit 305 further includes a load detection unit 504.

The load detection unit 504 is configured to: detect a power value of load connected to the second rectifier unit 302, and send the power value of the load connected to the second rectifier unit 302 to the control parameter generation unit 502, so that the control parameter generation unit 502 generates the control parameter based on the first data packet of the N first control units and the power value of the connection load. For example, when a voltage of the first rectifier unit 301 is increased or the power of the load connected to the second rectifier unit 302 is increased, the control parameter may indicate that a voltage that is output by the first rectifier unit 301 is increased, and when the voltage of the first rectifier unit 301 is decreased or the power of the load connected to the second rectifier unit 302 is decreased, the control parameter may indicate that the voltage that is output by the first rectifier unit 301 is decreased, to dynamically ensure that the voltage that is output by the second rectifier unit 302 is stable.

Optionally, power is independently supplied by an external power supply to the first control unit 303, the signal convergence unit 304, and the second control unit 305 in an isolated manner. The first control unit 303, the signal convergence unit 304, and the second control unit 305 may further obtain power from an adjacent rectifier unit, to reduce power supply difficulty. For example, power is supplied by a first rectifier unit 301 corresponding to each first control unit 303, power is supplied by one of the plurality of first rectifier units 301 to the signal convergence unit 304, and power is supplied by the second rectifier unit 302 to the second control unit 305, to reduce difficulty and costs of supplying power in an isolated manner.

According to the isolated communications apparatus provided in this embodiment, the newly added signal convergence unit receives the first data packets from N first control units, where N is a positive integer, and sends the first data packets of the N first control units to the second control unit, where the first data packet includes the operating parameter of the first rectifier unit and the identifier of the first control unit; and the signal convergence unit receives the at least one second data packet from the second control unit, determines, based on the identifier that is of the first control unit and that is included in each second data packet, the first control unit corresponding to each second data packet, and sends each second data packet to the first control unit corresponding to each second data packet, so that the first control unit controls the first rectifier unit corresponding to the first control unit. Compared with the conventional technology, in this embodiment, a quantity of used optical fibers used to transmit an optical signal can be greatly reduced, to effectively reduce communications costs and improve communications reliability.

Because power needs to be supplied to each first control unit 303 in an isolated manner, power supply difficulty is greatly increased. In some possible implementations, the isolated communications apparatus 300 further includes N auxiliary power supplies, to reduce power supply difficulty. The N auxiliary power supplies are in a one-to-one correspondence with the N first rectifier units 301, and the N auxiliary power supplies are in a one-to-one correspondence with the N first control units 303. Each auxiliary power supply 306 is configured to: obtain power from a first rectifier unit 301 corresponding to the auxiliary power supply 306, and supply power to a first control unit 303 corresponding to the auxiliary power supply 306.

Figure 6:
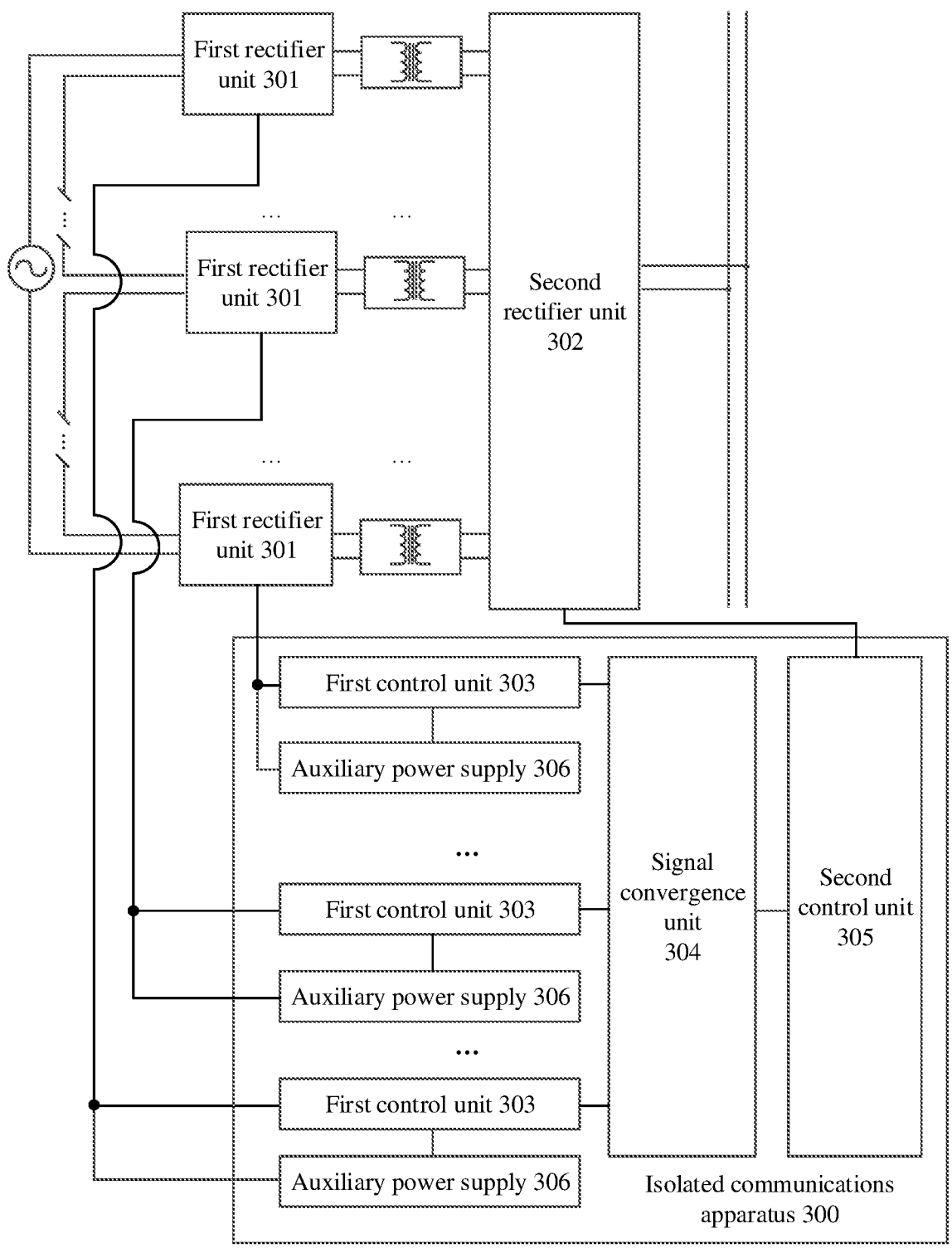
FIG. 6 is a schematic diagram of a structure of an isolated communications apparatus including an auxiliary power supply.

FIG. 6 is a schematic diagram of a structure of an isolated communications apparatus including an auxiliary power supply. A structure of the auxiliary power supply 306 is not limited. For example, the auxiliary power supply 306 may include a direct current capacitor and a quasi-resonant flyback converter. The direct current capacitor is externally connected to the first rectifier unit 301, so that power can be obtained from the externally connected direct current capacitor by using the quasi-resonant flyback converter. When power needs to be supplied to the first control unit 303, the power obtained by the auxiliary power supply 306 is provided for the first control unit 303. Based on the foregoing structure, the power is obtained from the first rectifier unit 301 and power is supplied to the first control unit 303, so that different power requirements of the first control unit 303 can be met, and difficulty of supplying power to the first control unit 303 is reduced.

When power is supplied by an external independent power supply to the signal convergence unit 304, a potential of the signal convergence unit 304 is low. Potentials of some first rectifier units 301 are high, and power is supplied by the auxiliary power supply 306 connected to the corresponding first rectifier unit 301 to the first control unit 303. Therefore, there is a large potential difference between a first control unit 303 and the signal convergence unit 304. As the potential difference increases, difficulty of transmitting data in an isolated manner also increases. In view of this, in some possible implementations, a target auxiliary power supply 307 in the N auxiliary power supplies 306 is further configured to supply power to the signal convergence unit 304, to reduce difficulty of transmitting data between the first control unit 303 and the signal convergence unit 304 in an isolated manner, and also supply power to the signal convergence unit 304. When N is greater than or equal to 3, a target first rectifier unit corresponding to the target auxiliary power supply 307 is a first rectifier unit 301 other than a first rectifier unit 301 with a lowest potential and a first rectifier unit 301 with a highest potential in the N first rectifier units 301.

Figure 7:
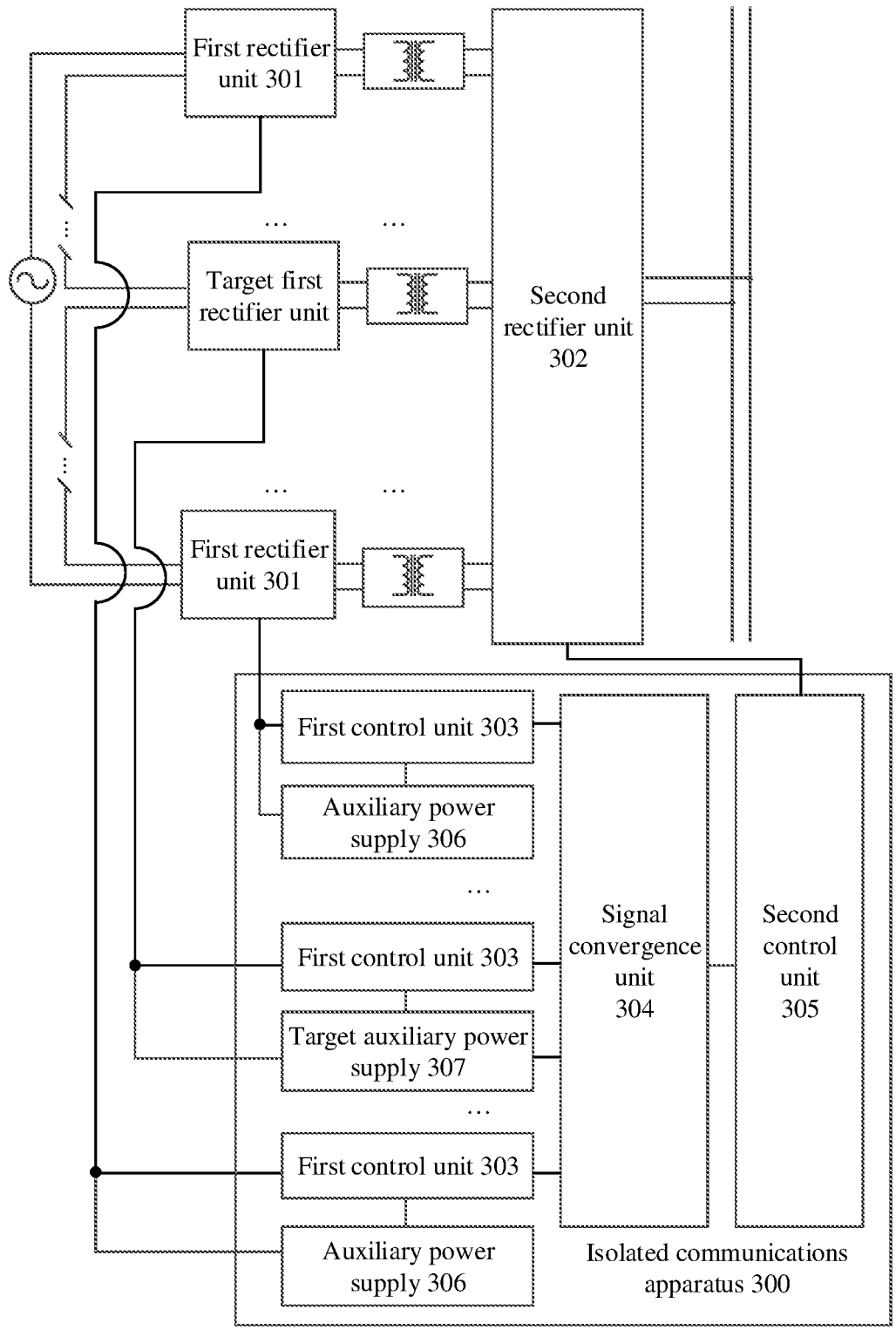
FIG. 7 is a schematic diagram of a connection structure of an auxiliary power supply.

FIG. 7 is a schematic diagram of a connection structure of an auxiliary power supply. Because the plurality of first rectifier units 301 are connected to each other in a cascaded manner, and the first rectifier units 301 that are connected in a cascaded manner divide a total voltage on a primary side, so that potentials of all the first rectifier units 301 are different. For example, a final first rectifier unit 301 is connected to a reference ground. Potentials of the first rectifier units 301 that are connected in a cascaded manner gradually decrease. A target first rectifier unit 301 other than a first rectifier unit 301 with a lowest potential and a first rectifier unit 301 with a highest potential is selected as the corresponding target auxiliary power supply 307, to reduce a potential difference between the first control unit 303 and the signal convergence unit 304. For example, when an input voltage is 10 kV and N=4, the four first rectifier units 301 are connected to each other in a cascaded manner, and potentials of the four first rectifier units 301 are respectively 10 kV, 7.5 kV, 5 kV, and 2.5 kV. A target auxiliary power supply 307 (for example, an auxiliary power supply whose potential is equal to or closest to a center potential, where the center potential is an average value of a potential of a first rectifier unit 301 with a highest potential and a potential of a first rectifier unit 301 with a lowest potential) corresponding to a target first rectifier unit (whose potential is 5 kV) or (whose potential is 7.5 kV) other than the first rectifier unit 301 (whose potential is 2.5 kV) with the lowest potential and the first rectifier unit 301 (whose potential is 10 kV) with the highest potential supplies power to the signal convergence unit 304. Therefore, a maximum voltage difference between the signal convergence unit 304 and each first control unit 303 is also less than 5 kV, which can significantly reduce difficulty of transmitting data in an isolated manner. Based on the foregoing structure, the potential difference between the signal convergence unit 304 and the first control unit 303 can be reduced, and difficulty of transmitting data in an isolated manner can be reduced.

In some possible implementations, an auxiliary power supply with an average potential in the N auxiliary power supplies is further configured to supply power to the signal convergence unit 304, to further reduce the potential difference between the first control unit 303 and the signal convergence unit 304. A first rectifier unit 301 corresponding to the average potential may be further a first rectifier unit 301 in the N first rectifier units 301, where a difference between the average potential of the N first rectifier units 301 and a potential of the first rectifier unit 301 is the smallest. For example, when an input voltage is 10 kV and N=5, five first rectifier units 301 are connected to each other in a cascaded manner, potentials of the five first rectifier units 301 are respectively 10 kV, 8 kV, 6 kV, 4 kV, and 2 kV, and an average potential of the N first rectifier units 301 is 6 kV. An auxiliary power supply with an average value that corresponds to the first rectifier unit (whose potential is 6 kV) may be used to supply power to the signal convergence unit 304, where the difference between the average potential 6 kV and the potential of the first rectifier unit is the smallest. Therefore, a maximum voltage difference between the signal convergence unit 304 and each first control unit 303 is less than 4 kV, which can further reduce difficulty of transmitting data in an isolated manner.

In some possible implementations, the signal convergence unit 304 includes M processing modules 308 and at least one optical module 309 corresponding to each processing module 308, where M is a positive integer, to facilitate communications redundancy backup and improve reliability of a power supply system.

Figure 8A:
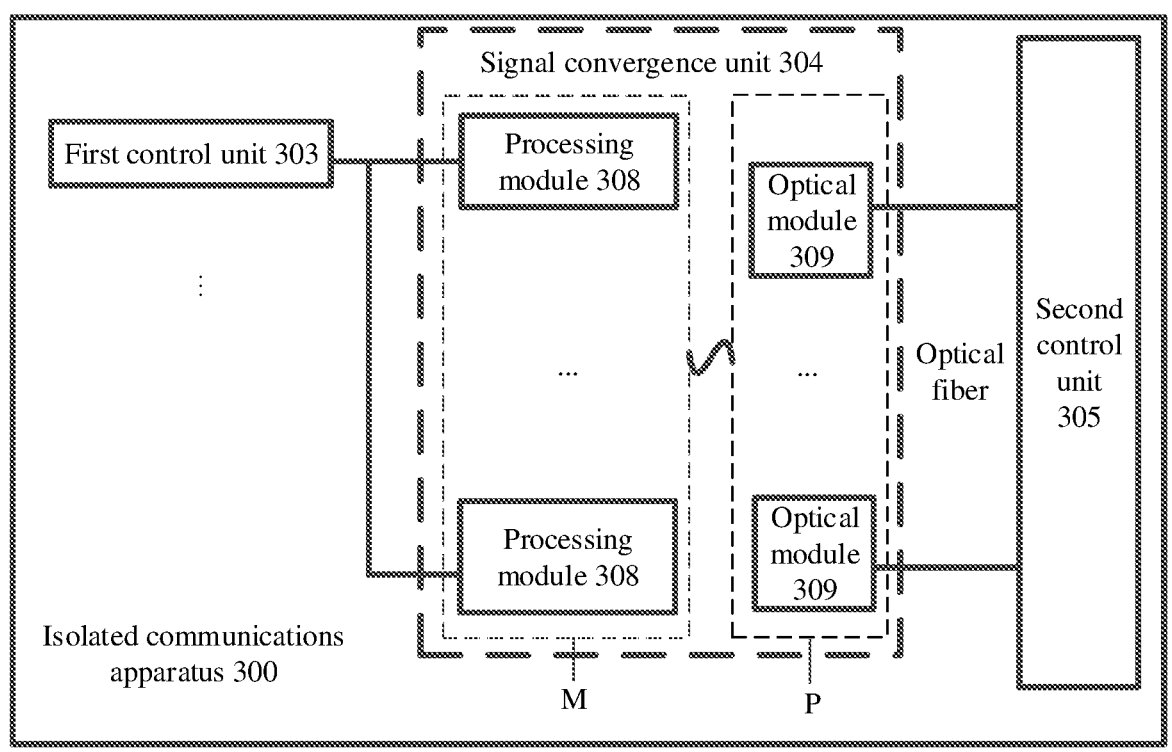
FIG. 8A is a schematic diagram of a structure of an isolated communications apparatus.

FIG. 8A is a schematic diagram of a structure of an isolated communications apparatus. Each processing module 308 is connected to the N first control units 303. Each processing module 308 is connected to at least one corresponding optical module 309. Different processing modules 308 may correspond to a same optical module 309 or may correspond to different optical modules 309. This is not limited. Each optical module 309 corresponding to each processing module 308 is connected to the second control unit 305 through an optical fiber.

In FIG. 8A, an example in which the signal convergence unit 304 includes a total of P optical modules 309 is used for description. P is a positive integer.

It should be noted that, a quantity of the M processing modules 308 is not limited. A value of M may be 1, 2, 3, or the like. In addition, a quantity of optical modules 309 corresponding to processing modules 308 is not limited, and quantities of optical modules corresponding to different processing modules may be the same or different. For example, a processing module 308a corresponds to an optical module 309a and an optical module 309b, a processing module 308b corresponds to an optical module 309b, and a processing module 308c corresponds to an optical module 309c and an optical module 309d.

Figure 8B:
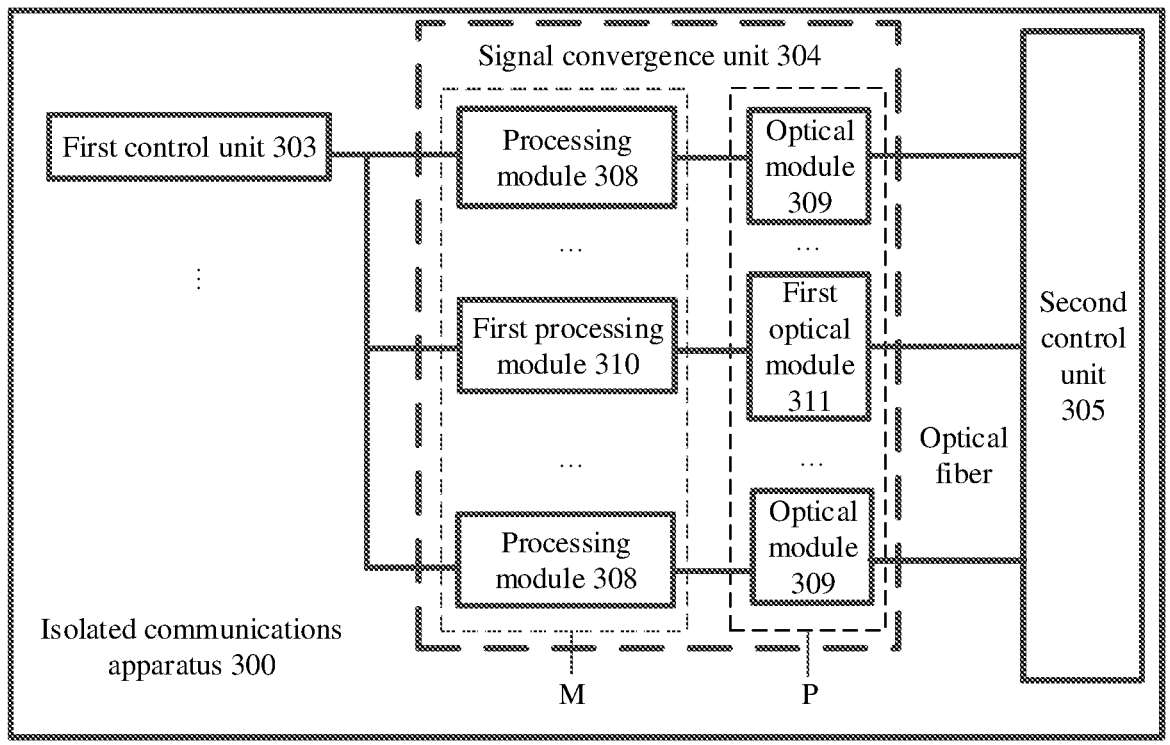
FIG. 8B is a schematic diagram of a structure of an isolated communications apparatus.

FIG. 8B is a schematic diagram of a structure of an isolated communications apparatus. Herein, a first processing module 310 in the M processing modules 308 is used as an example. The first processing module 310 in the M processing modules 308 is configured to: receive the first data packets from the N first control units 303, and send the first data packets of the N first control units 303 to a first optical module 311, where the first processing module 310 is included in the M processing modules 308, and the first optical module 311 is included in at least one optical module 309 corresponding to the first processing module 310; and receive the at least one second data packet from the second control unit 305 by using the first optical module 311, determine, based on the identifier that is of the first control unit 303 and that is included in each second data packet, the first control unit 303 corresponding to each second data packet, and send each second data packet to the first control unit 303 corresponding to each second data packet. A person skilled in the art should know that a quantity of first optical modules 311 in this embodiment is not limited to one shown in FIG. 8B, or there may be a plurality of first optical modules 311. In addition, a data packet distribution process described in this embodiment is based on a same concept as the foregoing embodiment. Details are not described herein again. Based on the structure described in the foregoing embodiment, when some processing modules 308 or optical modules 309 in the signal convergence unit 304 are damaged or faulty, data transmission can also be ensured, and functions such as output voltage control can be implemented. A person skilled in the art may independently set a quantity of processing modules 308 and a quantity of optical modules 309 as redundancy backup based on costs for design. In this way, based on only a small quantity of fiber channels, communications redundancy backup can be performed while data is transmitted in an isolated manner, to improve reliability of a power supply system.

Figure 9:
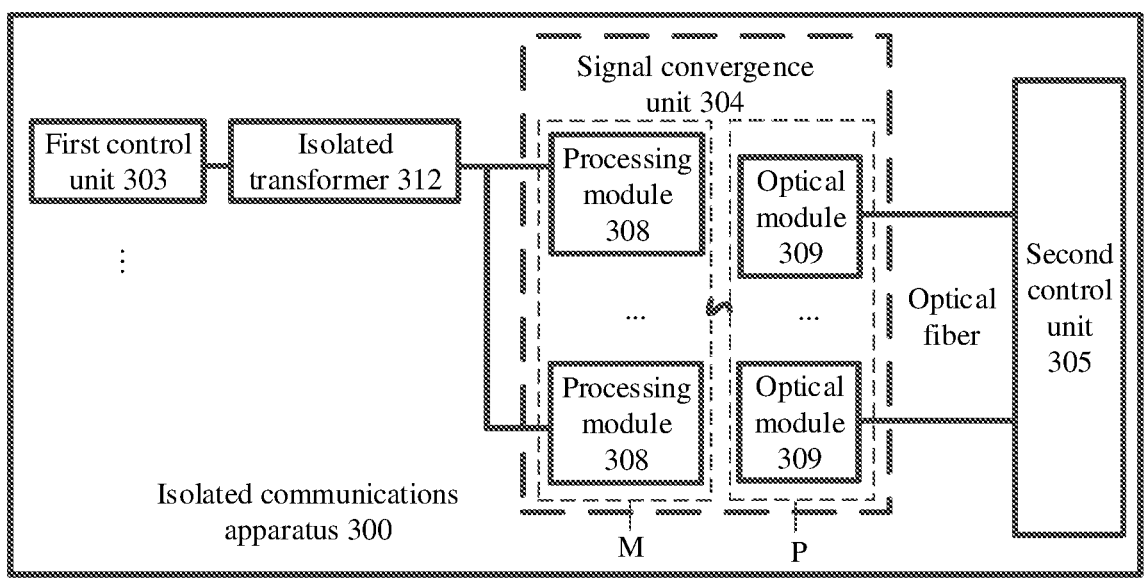
FIG. 9 is a schematic diagram of a structure of another isolated communications apparatus.

In some possible implementations, the apparatus further includes N isolated transformers 312. The N isolated transformers 312 are in a one-to-one correspondence with the N first control units 303, and each of the N isolated transformers 312 is connected to each of the M processing modules 308. FIG. 9 is a schematic diagram of a structure of another isolated communications apparatus.

Any one of the N isolated transformers 312 is configured to: receive a first electrical signal carrying a first data packet sent by a corresponding first control unit 303, perform isolation and voltage transformation processing on the first electrical signal, and send the first electrical signal obtained after the isolation and voltage transformation processing to the first processing module 310; and receive a second electrical signal that carries a second data packet and that is sent by the first processing module 310, perform isolation and voltage transformation processing on the second electrical signal, and send the second electrical signal obtained after the isolation and voltage transformation processing to the corresponding first control unit 303.

The isolated transformer 312 performs isolation and voltage transformation processing on the first electrical signal, so that electric on both sides can be completely insulated and loop-isolated, and high-frequency noise at both sides can be further suppressed from being transmitted, to comply with a safety regulation standard for isolation communication. Costs of the isolated transformer 312 are lower than costs of the optical fiber, and therefore communications costs are effectively reduced. In this way, the isolated transformer 312 with lower costs can be used to replace a transmission device such as the optical fiber with higher costs, to improve communications reliability of the power supply system while reducing costs.

Figure 10:
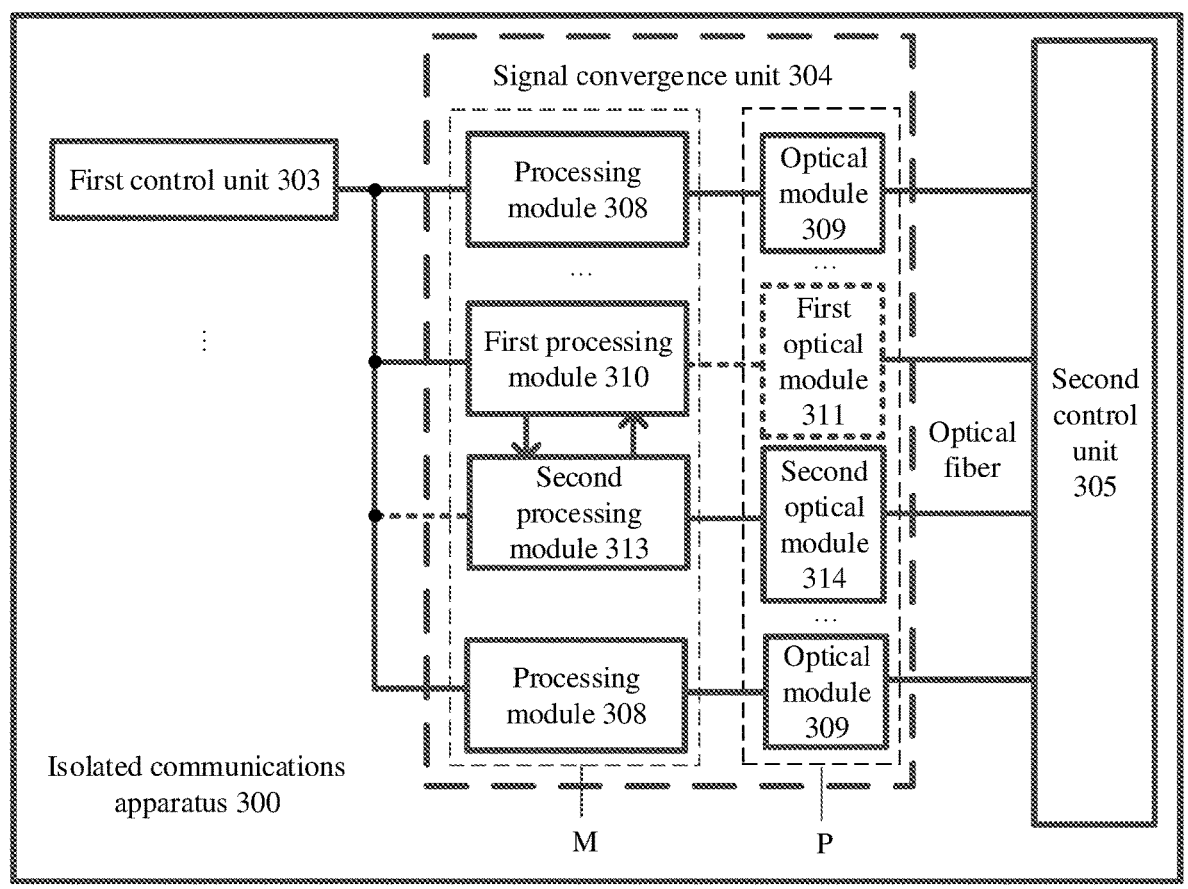
FIG. 10 is a schematic diagram of a structure of communication between processing modules.

The M processing modules may also communicate with each other, to further ensure communications reliability. FIG. 10 is a schematic diagram of a structure of communication between processing modules. In some possible implementations, the M processing modules 309 further include a second processing module 313.

The first processing module 310 is further configured to: after receiving the first data packets from the N first control units 303, send the first data packets of the N first control units 303 to the second processing module 313; and receive at least one third data packet returned by the second processing module 313, determine, based on the identifier that is of the first control unit 303 and that is included in each third data packet, a first control unit 303 corresponding to each third data packet, and send each third data packet to the first control unit 303 corresponding to each third data packet.

The second processing module 313 is configured to: receive the first data packets that are of the N first control units 303 and that are sent by the first processing unit 303, and send the first data packets of the N first control units 303 to a second optical module 314, where the second optical module 314 is included in at least one optical module 309 corresponding to the second processing module 313; and receive at least one third data packet from the second control unit 305 by using the second optical module 314, and return the at least one third data packet of the second control unit 305 to the first processing module 310. Based on the foregoing structure, when the first optical module 311 is faulty and the second processing module 313 is disconnected from the first control unit 303, data transmission can also be ensured through data exchange between the first processing module 310 and the second processing module 313, and functions such as output voltage control can be implemented. This further improves reliability of the power supply system.

In addition, the isolated communications apparatus in this embodiment may be applied to power supply systems of various voltage levels. Commonly, an input voltage of the power supply system may be 10 kV, 35 kV, or the like. When the input voltage of the power supply system is greater than a specified voltage threshold, each of a plurality of signal convergence units 304 can transmit data in an isolated manner, to reduce a quantity of optical transmission units while supporting a power supply system with a higher input voltage. In this embodiment, the specified voltage threshold is 10 kV, and the specified voltage threshold may be freely set by a person skilled in the art. This is not limited herein.

In some possible implementations, the isolated communications apparatus 300 further includes a plurality of signal convergence units 304 and a plurality of isolation communications groups. The isolation communications group includes a specified quantity of first control units 303, and each signal convergence unit 304 is connected to all first control units 303 in one isolation communications group.

Figure 11:
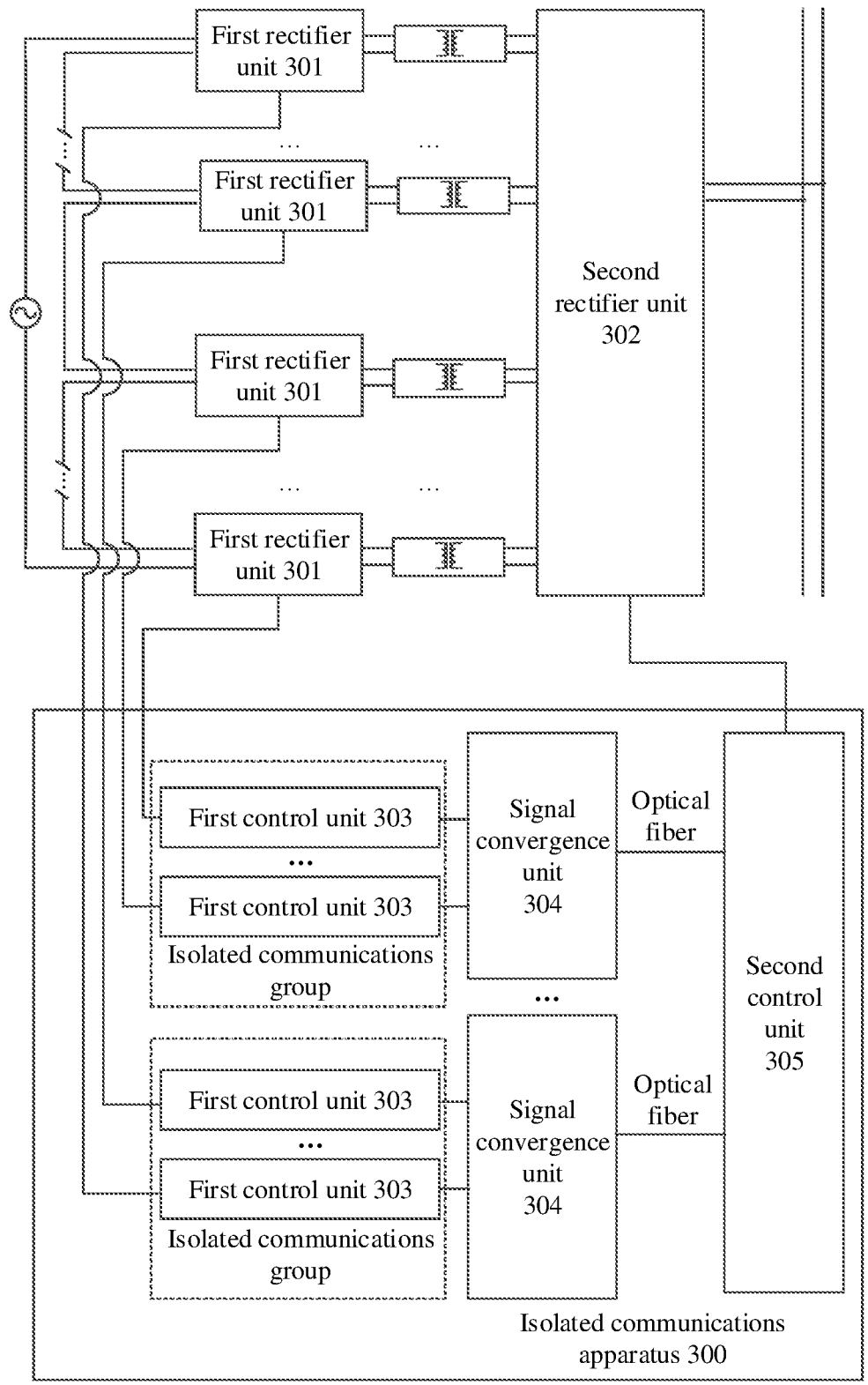
FIG. 11 is a schematic diagram of a structure of packet communication of an isolated communications apparatus.

FIG. 11 is a schematic diagram of a structure of packet communication of an isolated communications apparatus. The plurality of first rectifier units 301 that are connected in a cascaded manner evenly divide the input voltage, and the first rectifier unit 301 has a withstand voltage upper limit. Therefore, when the input voltage of the power supply system increases, a quantity of first rectifier units 301 that are connected in a cascaded manner also increases, and a quantity of first control units 303 increases accordingly. When power is supplied by an auxiliary power supply 306 corresponding to the first control unit 303, if one signal convergence unit 304 is still used for data transmission, a potential difference between a first control units 303 and the signal convergence unit 304 does not meet a safety regulation requirement.

Therefore, the first control units 303 may be first grouped, and a plurality of first rectifier units 301 obtained after the grouping form a plurality of isolation communications groups. The plurality of isolation communications groups are in a one-to-one correspondence with the plurality of signal convergence units 304, and a first control unit 303 in each isolation communications group is connected to a corresponding signal convergence unit 304, so that a potential difference between the first control unit 303 and the signal convergence unit 304 connected to the first control unit 303 meets a safety regulation requirement. For example, if the input voltage of the power supply system is 35 kV, the input voltage may be evenly divided by 30 first rectifier units 301 that are connected in a cascaded manner. 30 first control units 303 are grouped into three isolation communications groups, and (10) first control units 303 in each isolation communications group are connected to a same signal convergence unit 304. In this case, a potential difference between the first rectifier unit 301 in each isolation communications group and the signal convergence unit 304 meets a safety regulation requirement. When the input voltage is high, data transmission can also be ensured, functions such as output voltage control can be implemented, and a quantity of used optical fibers and a quantity of used optical modules can be greatly reduced. This effectively improves communications reliability and reduces communications costs.

An embodiment further provides a power supply system. The power supply system includes a transformer and the isolated communications apparatus described in the foregoing embodiment.

According to the isolated communications apparatus and the power supply system provided in the embodiments, the newly added signal convergence unit can receive the first data packets from N first control units, where N is a positive integer, and send the first data packets of the N first control units to the second control unit, where the first data packet includes the operating parameter of the first rectifier unit and the identifier of the first control unit; and the signal convergence unit receives the at least one second data packet from the second control unit, determines, based on the identifier that is of the first control unit and that is included in each second data packet, the first control unit corresponding to each second data packet, and sends each second data packet to the first control unit corresponding to each second data packet, so that the first control unit controls the first rectifier unit corresponding to the first control unit. Therefore, a quantity of used optical fibers can be greatly reduced, to effectively improve communications reliability and reduce communications costs.

A person skilled in the art should understand that the embodiments may be provided as a method, a system, or a computer program product. Therefore, there may be hardware only embodiments, software only embodiments, or embodiments with a combination of software and hardware. In addition, a computer program product may be implemented on one or more computer-usable storage media (including but not limited to a magnetic disk memory, a CD-ROM, an optical memory, and the like) that include computer-usable program code.

The embodiments are described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a function in one or more processes in the flowcharts and/or in one or more blocks in the block diagrams.

These computer program instructions may alternatively be stored in a computer-readable memory that can indicate a computer or another programmable data processing device to work in a manner so that the instructions stored in the computer-readable memory generate an artifact that includes an instruction apparatus. The instruction apparatus implements a function in one or more processes in the flowcharts and/or in one or more blocks in the block diagrams.

These computer program instructions may alternatively be loaded onto a computer or another programmable data processing device, so that a series of operations and steps are performed on the computer or another programmable device, thereby generating computer-implemented processing. Therefore, the instructions executed on the computer or another programmable device provide steps for implementing a specified function in one or more processes in the flowcharts and/or in one or more blocks in the block diagrams.

It is clear that a person skilled in the art can make various modifications and variations to the embodiments without departing from the scope of the embodiments.

What is claimed is:

1. An isolated communications apparatus, applied to a transformer, wherein the transformer comprises N first rectifier units and a second rectifier unit, a potential difference between at least one of the N first rectifier units and the second rectifier unit is greater than a specified threshold, and the N first rectifier units are connected to each other in a cascaded manner; the isolated communications apparatus comprises N first control units, a second control unit, and a signal convergence unit; the N first control units are in a one-to-one correspondence with the N first rectifier units, and each first control unit is connected to a corresponding first rectifier unit; and each of the N first control units is connected to the signal convergence unit, the signal convergence unit and the second control unit are connected through an optical fiber, and N is a positive integer;
  any one of the N first control units is configured to:
    detect an operating parameter of the corresponding first rectifier unit, and
    generate a first data packet based on the detected operating parameter, wherein the first data packet comprises an identifier of the first control unit,
    send the first data packet to the signal convergence unit,
    receive a second data packet sent by the signal convergence unit, wherein the second data packet comprises the identifier of the first control unit and a control parameter, and
    adjust the operating parameter of the corresponding first rectifier unit based on the control parameter;
  the signal convergence unit is configured to:
    receive first data packets from the N first control units,
    send the first data packets of the N first control units to the second control unit,
    receive at least one second data packet from the second control unit,
    determine, based on the identifier that is of the first control unit and that is comprised in each second data packet, a first control unit corresponding to each second data packet, and
    send each second data packet to the first control unit corresponding to each second data packet; and
  the second control unit is configured to:
    receive the first data packets of the N first control units from the signal convergence unit,
    generate, based on the first data packets of the N first control units, a second data packet corresponding to at least one first control unit, and
    send, to the signal convergence unit, the second data packet corresponding to the at least one first control unit.

2. The isolated communications apparatus according to claim 1, wherein the apparatus further comprises:
  N auxiliary power supplies, the N auxiliary power supplies are in a one-to-one correspondence with the N first rectifier units, the N auxiliary power supplies are in a one-to-one correspondence with the N first control units, and each auxiliary power supply is configured to:
    obtain power from the corresponding first rectifier unit, and supply power to the corresponding first control unit.

3. The isolated communications apparatus according to claim 2, wherein a target auxiliary power supply in the N auxiliary power supplies is further configured to supply power to the signal convergence unit, and a target first rectifier unit corresponding to the target auxiliary power supply is a first rectifier unit other than a first rectifier unit with a lowest potential and a first rectifier unit with a highest potential in the N first rectifier units.

4. The isolated communications apparatus according to claim 1, wherein the signal convergence unit comprises M processing modules and at least one optical module corresponding to each processing module, wherein M is a positive integer;
  each processing module is connected to the N first control units;
  each processing module is connected to at least one corresponding optical module;
  each optical module corresponding to each processing module is connected to the second control unit through an optical fiber; and
  a first processing module in the M processing modules is configured to: receive the first data packets from the N first control units, and send the first data packets of the N first control units to a first optical module, wherein the first processing module is comprised in the M processing modules, and the first optical module is comprised in at least one optical module corresponding to the first processing module; and receive the at least one second data packet from the second control unit by using the first optical module, determine, based on the identifier that is of the first control unit and that is comprised in each second data packet, the first control unit corresponding to each second data packet, and send each second data packet to the first control unit corresponding to each second data packet.

5. The isolated communications apparatus according to claim 4, wherein the apparatus further comprises:
  N isolated transformers; and the N isolated transformers are in a one-to-one correspondence with the N first control units, and each of the N isolated transformers is connected to each of the M processing modules; and
  any one of the N isolated transformers is configured to:
    receive a first electrical signal carrying a first data packet sent by a corresponding first control unit,
    perform isolation and voltage transformation processing on the first electrical signal,
    send the first electrical signal obtained after the isolation and voltage transformation processing to the first processing module,
    receive a second electrical signal that carries a second data packet and that is sent by the first processing module,
    perform isolation and voltage transformation processing on the second electrical signal, and
    send the second electrical signal obtained after the isolation and voltage transformation processing to the corresponding first control unit.

6. The isolated communications apparatus according to claim 4, wherein the M processing modules further comprise a second processing module;
  the first processing module is further configured to: after receiving the first data packets from the N first control units,
    send the first data packets of the N first control units to the second processing module,
    receive at least one third data packet returned by the second processing module,
    determine, based on the identifier that is of the first control unit and that is comprised in each third data packet, a first control unit corresponding to each third data packet, and
    send each third data packet to the first control unit corresponding to each third data packet; and
  the second processing module is configured to:
    receive the first data packets that are of the N first control units and that are sent by the first processing unit, and
    send the first data packets of the N first control units to a second optical module, wherein the second optical module is comprised in at least one optical module corresponding to the second processing module,
    receive at least one third data packet from the second control unit by using the second optical module, and
    return the at least one third data packet of the second control unit to the first processing module.

7. The isolated communications apparatus according to claim 1, wherein when generating, based on the first data packets of the N first control units, the second data packet corresponding to the at least one first control unit, the second control unit is further configured to:

detect an operating parameter of the second rectifier unit, and generate, based on the first data packets of the N first control units and the operating parameter of the second rectifier unit, the second data packet corresponding to the at least one first control unit.

8. The isolated communications apparatus according to claim 7, wherein the operating parameter of the second rectifier unit comprises a power value of load connected to the second rectifier unit.

9. The isolated communications apparatus according to claim 1, wherein an operating parameter of any first rectifier unit comprises a voltage value of the first rectifier unit and a current value of the first rectifier unit.

10. A power supply system, wherein the power supply system comprises a transformer and an isolated communications apparatus applied to the transformer, wherein the transformer comprises N first rectifier units and a second rectifier unit, a potential difference between at least one of the N first rectifier units and the second rectifier unit is greater than a specified threshold, and the N first rectifier units are connected to each other in a cascaded manner; the isolated communications apparatus comprises N first control units, a second control unit, and a signal convergence unit; the N first control units are in a one-to-one correspondence with the N first rectifier units, and each first control unit is connected to a corresponding first rectifier unit; and each of the N first control units is connected to the signal convergence unit, the signal convergence unit and the second control unit are connected through an optical fiber, and N is a positive integer;

any one of the N first control units is configured to:
        detect an operating parameter of the corresponding first rectifier unit, and
        generate a first data packet based on the detected operating parameter, wherein the first data packet comprises an identifier of the first control unit,
        send the first data packet to the signal convergence unit,
        receive a second data packet sent by the signal convergence unit, wherein the second data packet comprises the identifier of the first control unit and a control parameter, and
        adjust the operating parameter of the corresponding first rectifier unit based on the control parameter;
    the signal convergence unit is configured to:
        receive first data packets from the N first control units,
        send the first data packets of the N first control units to the second control unit,
        receive at least one second data packet from the second control unit,
        determine, based on the identifier that is of the first control unit and that is comprised in each second data packet, a first control unit corresponding to each second data packet, and
        send each second data packet to the first control unit corresponding to each second data packet; and
    the second control unit is configured to:
        receive the first data packets of the N first control units from the signal convergence unit,
        generate, based on the first data packets of the N first control units, a second data packet corresponding to at least one first control unit, and
        send, to the signal convergence unit, the second data packet corresponding to the at least one first control unit.

11. The power supply system according to claim 10, wherein the isolated communications apparatus further comprises N auxiliary power supplies, the N auxiliary power supplies are in a one-to-one correspondence with the N first rectifier units, the N auxiliary power supplies are in a one-to-one correspondence with the N first control units, and each auxiliary power supply is configured to: obtain power from the corresponding first rectifier unit, and supply power to the corresponding first control unit.

12. The power supply system according to claim 11, wherein a target auxiliary power supply in the N auxiliary power supplies is further configured to supply power to the signal convergence unit, and a target first rectifier unit corresponding to the target auxiliary power supply is a first rectifier unit other than a first rectifier unit with a lowest potential and a first rectifier unit with a highest potential in the N first rectifier units.

13. The power supply system according to claim 10, wherein the signal convergence unit comprises M processing modules and at least one optical module corresponding to each processing module, wherein M is a positive integer;

each processing module is connected to the N first control units;
    each processing module is connected to at least one corresponding optical module;
    each optical module corresponding to each processing module is connected to the second control unit through an optical fiber; and
    a first processing module in the M processing modules is configured to:
        receive the first data packets from the N first control units,
        send the first data packets of the N first control units to a first optical module, wherein the first processing module is comprised in the M processing modules, and the first optical module is comprised in at least one optical module corresponding to the first processing module,
        receive the at least one second data packet from the second control unit by using the first optical module,
        determine, based on the identifier that is of the first control unit and that is comprised in each second data packet, the first control unit corresponding to each second data packet, and
        send each second data packet to the first control unit corresponding to each second data packet.

14. The power supply system according to claim 13, wherein the isolated communications apparatus further comprises N isolated transformers; and the N isolated transformers are in a one-to-one correspondence with the N first control units, and each of the N isolated transformers is connected to each of the M processing modules; and any one of the N isolated transformers is configured to:
        receive a first electrical signal carrying a first data packet sent by a corresponding first control unit,
        perform isolation and voltage transformation processing on the first electrical signal,
        send the first electrical signal obtained after the isolation and voltage transformation processing to the first processing module,
        receive a second electrical signal that carries a second data packet and that is sent by the first processing module,
        perform isolation and voltage transformation processing on the second electrical signal, and send the second electrical signal obtained after the isolation and voltage transformation processing to the corresponding first control unit.

15. The power supply system according to claim 13, wherein the M processing modules further comprise a second processing module;

the first processing module is further configured to: after receiving the first data packets from the N first control units,
send the first data packets of the N first control units to the second processing module,
determine, based on the identifier that is of the first control unit and that is comprised in each third data packet, a first control unit corresponding to each third data packet, and
send each third data packet to the first control unit corresponding to each third data packet;

the second processing module is configured to:
receive the first data packets that are of the N first control units and that are sent by the first processing unit,
send the first data packets of the N first control units to a second optical module, wherein the second optical module is comprised in at least one optical module corresponding to the second processing module;
receive at least one third data packet from the second control unit by using the second optical module, and
return the at least one third data packet of the second control unit to the first processing module.

16. The power supply system according to claim 10, wherein when generating, based on the first data packets of the N first control units, the second data packet corresponding to the at least one first control unit, the second control unit is further configured to:
detect an operating parameter of the second rectifier unit, and
generate, based on the first data packets of the N first control units and the operating parameter of the second rectifier unit, the second data packet corresponding to the at least one first control unit.

17. The power supply system according to claim 16, wherein the operating parameter of the second rectifier unit comprises a power value of load connected to the second rectifier unit.

18. The power supply system according to claim 10, wherein an operating parameter of any first rectifier unit comprises a voltage value of the first rectifier unit and a current value of the first rectifier unit.

* * * * *